(12) United States Patent
Chung

(10) Patent No.: US 8,405,571 B2
(45) Date of Patent: Mar. 26, 2013

(54) DISPLAY DEVICE IN A MOBILE TERMINAL AND METHOD FOR CONTROLLING THE SAME

(75) Inventor: Jinwoo Chung, Seoul (KR)

(73) Assignee: LG Electronics Inc., Seoul (KR)

( * ) Notice: Subject to any disclaimer, the term of this patent is extended or adjusted under 35 U.S.C. 154(b) by 183 days.

(21) Appl. No.: 12/862,339

(22) Filed: Aug. 24, 2010

(65) Prior Publication Data

US 2011/0050975 A1    Mar. 3, 2011

(30) Foreign Application Priority Data

Aug. 25, 2009   (KR) ........................ 10-2009-0078658

(51) Int. Cl.
*G09G 5/00*  (2006.01)
*H04N 5/222*  (2006.01)
*H04M 1/00*  (2006.01)

(52) U.S. Cl. ..................... 345/1.1; 345/1.3; 348/333.05; 455/575.4

(58) Field of Classification Search .................... None
See application file for complete search history.

(56) References Cited

U.S. PATENT DOCUMENTS

| 7,633,744 B2 * | 12/2009 | Kuhn | 361/679.04 |
|---|---|---|---|
| 2005/0054393 A1 * | 3/2005 | Fagerstrom et al. | 455/575.1 |
| 2008/0261666 A1 * | 10/2008 | Niitsu et al. | 455/575.4 |
| 2009/0021586 A1 * | 1/2009 | Yumiki | 348/207.2 |
| 2009/0280869 A1 * | 11/2009 | Sasaki | 455/566 |
| 2010/0039350 A1 * | 2/2010 | Wakefield et al. | 345/1.3 |
| 2010/0039372 A1 * | 2/2010 | Futter | 345/156 |
| 2010/0041451 A1 * | 2/2010 | Washiyama | 455/575.4 |
| 2010/0053342 A1 * | 3/2010 | Hwang et al. | 348/207.99 |
| 2010/0056222 A1 * | 3/2010 | Choi et al. | 455/566 |
| 2010/0060587 A1 * | 3/2010 | Freund | 345/169 |
| 2010/0159993 A1 * | 6/2010 | Davidson et al. | 455/566 |
| 2010/0178963 A1 * | 7/2010 | Iwaki | 455/575.4 |
| 2010/0222116 A1 * | 9/2010 | Burbidge | 455/575.4 |

* cited by examiner

*Primary Examiner* — Lin Ye
*Assistant Examiner* — John H Morehead, III
(74) *Attorney, Agent, or Firm* — KED & Associates, LLP

(57) ABSTRACT

A mobile terminal and a method for displaying menus in the mobile terminal are disclosed herein. The mobile terminal includes a main body having a main display, a first sliding assembly including a first sub-display, and a second sliding assembly including a second sub-display slidably positioned on the main body. Various menus may be displayed on the main display, the first sub-display and the second sub-display based on the position of the first and second sliding assemblies and the orientation of the mobile terminal.

20 Claims, 13 Drawing Sheets

DISPLAY DEVICE IN A MOBILE TERMINAL AND METHOD FOR CONTROLLING THE SAME

CROSS-REFERENCE TO RELATED APPLICATION(S)

Pursuant to 35 U.S.C. §119(a), this application claims the benefit of earlier filing date and right of priority to Korean Application No. 10-2009-0078658, filed in Korea on Aug. 25, 2009, the contents of which are hereby incorporated by reference herein in their entirety.

BACKGROUND

1. Field

A display device in a mobile terminal and a method for controlling the same are disclosed herein.

2. Background

Mobile terminals and method for controlling the same are known. However, they suffer from various disadvantages.

BRIEF DESCRIPTION OF THE DRAWINGS

The embodiments will be described in detail with reference to the following drawings in which like reference numerals refer to like elements, wherein.

DETAILED DESCRIPTION

Generally, terminals may be classified as mobile or portable terminals and stationary terminals. Mobile terminals may be configured to be handheld terminals, vehicle mount terminals, or other appropriate portable configurations based on the needs of the user.

A terminal may be configured to perform multiple functions. For example, the terminal may be implemented as a multimedia player provided with composite functions to capture still pictures or videos, playback music or video, play games, receive broadcast signals, or other similar functions.

In order to support the increased functionality of the terminal, improvements in structural and/or software components of the terminal may be considered. For example, the mobile terminal may be configured to have a variety of structures to provide an efficient interface to the various functions. Based on the functionalities and user needs, the mobile terminal may be implemented as a sliding type, a folding type, a swivel type, or a bar type.

Simply for ease of explanation, the terminal as broadly described and embodied herein is described as being a mobile terminal. However, embodiments of the present disclosure may be applicable to various types of terminals. Examples of such terminals may include mobile terminals as well as stationary terminals, for example, mobile phones, user equipment, smart phones, DTV, desktop or laptop computers, digital broadcast terminals, personal digital assistants (PDA), portable multimedia players (PMP), navigation systems, and other similar devices.

Figure 1:
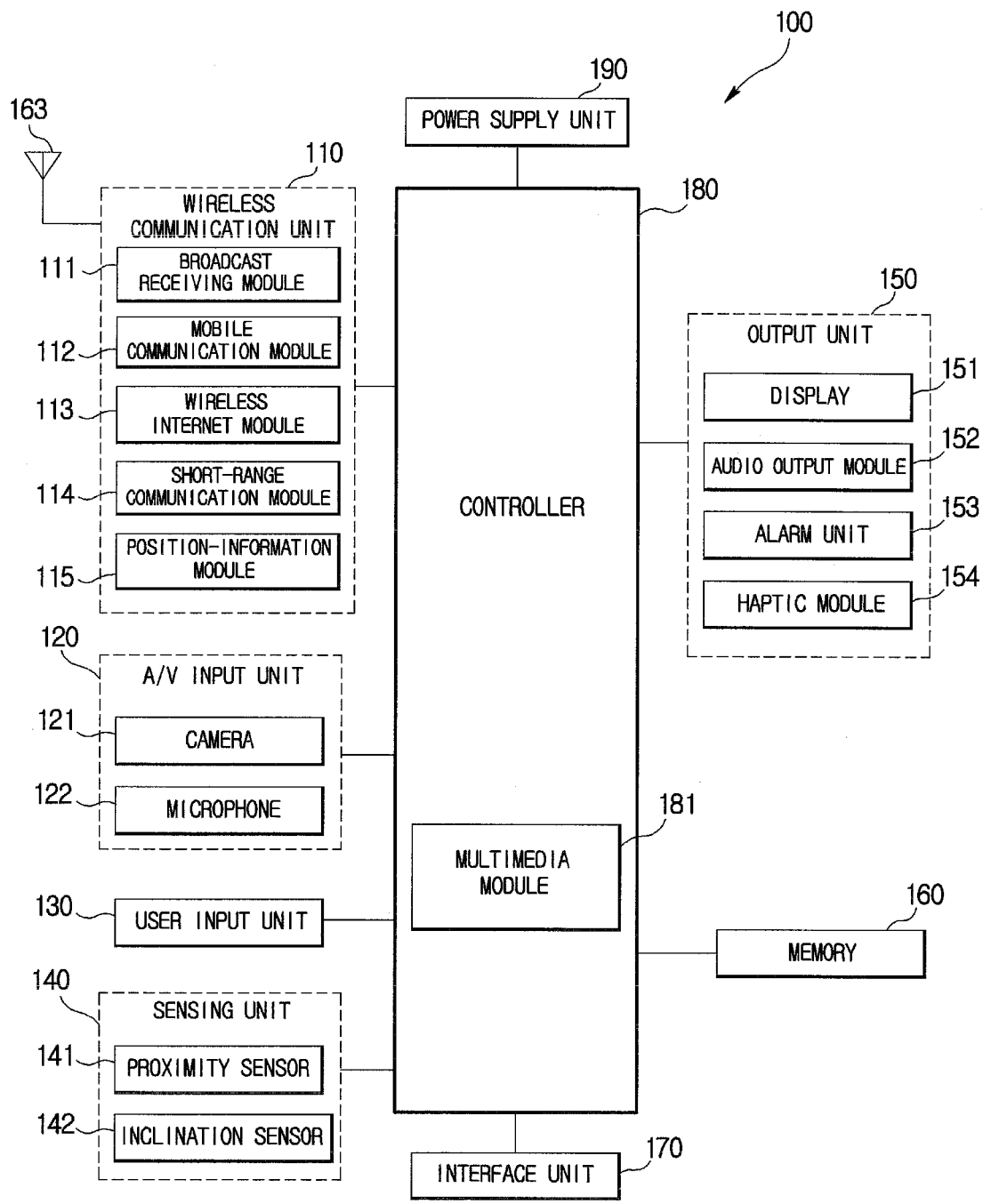
FIG. 1 is a block diagram of a mobile terminal according to an embodiment of the present disclosure.

FIG. 1 is a block diagram of a mobile terminal according to an embodiment. The mobile terminal 100 may include a wireless communication unit 110, an audio/video (NV) input unit 120, a user input unit 130, a sensing unit 140, an output unit 150, a memory 160, an interface unit 170, a controller 180, and a power supply unit 190.

The wireless communication unit 110 may be configured with various combinations of components or modules, based on the desired functionality of the mobile terminal 100. For example, the wireless communication unit 110 may include a broadcast receiving module 111, a mobile communication module 112, a wireless Internet module 113, a short-range communication module 114 and a position-information module 115 (position-location module). The wireless communication interface 110 may also include one or more components that permit wireless communication between the mobile terminal 100 and a wireless communication system or a network within which the mobile terminal 100 is located. For non-mobile terminals, the wireless communication unit 110 may be replaced with a wired communication unit. The wireless communication unit 110 and the wired communication unit may be commonly referred to as a communication unit or interface.

The broadcast receiving module 111 may receive a broadcast signal and/or broadcast associated information from an external broadcast managing entity via a broadcast channel. A broadcast channel may include a satellite channel or a terrestrial channel. The broadcast managing entity may be a system that transmits a broadcast signal and/or broadcast associated information. Moreover, two or more broadcast receiving modules 111 may be provided in the mobile terminal 100 for simultaneous reception of two or more broadcast channels or for facilitation of broadcast channel switching.

Examples of a broadcast associated information may include information associated with a broadcast channel, a broadcast program, a broadcast service provider, or other appropriate information associated with a broadcast. For example, the broadcast associated information may include an electronic program guide (EPG) of digital multimedia broadcasting (DMB) and an electronic service guide (ESG) of digital video broadcast-handheld (DVB-H).

The broadcast signal may be a TV broadcast signal, a radio broadcast signal, and/or a data broadcast signal. The broadcast signal may also be a combination of multiple broadcast signals. For example, the broadcast signal may include a data broadcast signal combined with a TV or radio broadcast signal.

The broadcast receiving module 111 may receive broadcast signals transmitted from various types of broadcast systems. For example, the broadcasting systems may include digital multimedia broadcasting-terrestrial (DMB-T), digital multimedia broadcasting-satellite (DMB-S), digital video broadcast-handheld (DVB-H), a data broadcasting system known as media forward link only (MediaFLO®), integrated services digital broadcast-terrestrial (ISDB-T), or other appropriate broadcasting systems. Additionally, multicast signals may also be received. Data received by the broadcast receiving module 111 may be stored in the memory 160 for subsequent access or transfer to another device.

The mobile communication module 112 may communicate wireless signals with one or more network entities, for example, a base station or a Node-B. The signals may represent audio, video, multimedia, control signaling, payload, meta data, or other appropriate types of data.

The wireless Internet module 113 may support Internet access for the mobile terminal 100. The wireless Internet module 113 may be internally or externally coupled to the mobile terminal 100. Suitable technologies for wireless Internet may include, but are not limited to, WLAN (Wireless LAN) (Wi-Fi), Wibro (Wireless broadband), Wimax (World Interoperability for Microwave Access), and/or HSDPA (High Speed Downlink Packet Access). The wireless Internet module 113 may be replaced with a wired Internet module in non-mobile terminals. The wireless Internet module 113 and the wired Internet module may be referred to as an Internet module.

The short-range communication module 114 may facilitate short-range communications. Suitable technologies for short-range communication may include, but are not limited to, radio frequency identification (RFID), infrared data association (IrDA), ultra-wideband (UWB), as well as networking technologies such as Bluetooth and ZigBee.

The position-information module 115 may identify or otherwise obtain a location of the mobile terminal 100. The position-information module 115 may be provided with global positioning system (GPS) components that cooperate with associated satellites and/or network components.

The audio/video (NV) input unit 120 may provide audio or video signal input to the mobile terminal 100. The A/V input unit 120 may include a camera 121 and a microphone 122. The camera 121 may receive and process image frames of still pictures and/or video. The microphone 122 may receive an external audio signal while the mobile terminal is in a particular mode, such as a phone call mode, a recording mode, or a voice recognition mode. The received audio signal may then be processed and converted into digital data for subsequent use.

The mobile terminal 100, and in particular the A/V input unit 120, may include a noise removing algorithm (or noise canceling algorithm) to remove noise generated in the course of receiving the external audio signal. Data generated by the A/V input unit 120 may be stored in the memory 160, utilized by the output unit 150, or transmitted via one or more modules of the wireless communication unit 110. Moreover, two or more microphones and/or cameras may also be provided in the mobile terminal 100.

The user input unit 130 may generate input data responsive to user manipulation of an associated input device or a combination of devices. Examples of such devices may include a keypad, a dome switch, a touchpad (e.g., static pressure/capacitance), a jog wheel, a jog switch, or other similar user interface devices. Simply for ease of discussion, the user input unit 130 is configured as a touchpad in cooperation with a display, as will be described in further detail hereinbelow. However, the user input unit 130 is not limited thereto, and may be configured to be any of the input devices as described above.

The sensing unit 140 may provide measurements regarding various aspects of the mobile terminal 100. For example, the sensing unit 140 may detect an open/close status (or state) of the mobile terminal 100, a relative positioning of components (e.g., a display and a keypad) of the mobile terminal 100, a change in position of the mobile terminal 100 or a component of the mobile terminal 100, a presence or absence of user contact with the mobile terminal 100, and/or an orientation or acceleration/deceleration of the mobile terminal 100.

The sensing unit 140 may provide additional functionality based on the structural type of the mobile terminal 100. For example, when the mobile terminal 100 is configured as a slide-type mobile terminal, the sensing unit 140 may sense whether a sliding portion (or sliding assembly) of the mobile terminal 100 is open or closed. Moreover, the sensing unit 140 may also sense a presence or absence of power provided by the power supply unit 190, or a presence or absence of a coupling or other connection between the interface unit 170 and an external device. For example, the sensing unit 140 may determine whether the mobile terminal 100 is seated properly to a data/charging cradle. The sensing unit 140 may also include a proximity sensor 141 and an inclination sensor 142 (orientation sensor).

The output unit 150 may generate an output associated with various senses, including visual, auditory, tactile senses and/or the like. The output unit 150 may include a display 151, an audio output module 152, an alarm unit 153, a haptic module 154, or other appropriate output devices.

The display 151 may display information processed by the terminal 100. For example, when the terminal is in a call mode, the display 151 may display a user interface (UI) or a graphic user interface (GUI) associated with the call. If the mobile terminal 100 is in a video communication mode or a photograph mode (camera mode), the display 151 may display a video or still image. The display 151 may also display a UI or a GUI associated with the video communication or photograph modes.

The display 151 may include at least one of a liquid crystal display (LCD), a thin film transistor liquid crystal display (TFT LCD), an organic light-emitting diode (OLED), a flexible display, or a 3-dimensional display. The display 151 may have a transparent or light-transmissive type configuration such that objects positioned behind the display 151 may be visible. This type of a display may be referred to as a transparent display. A transparent OLED (TOLED) is an example of a transparent display. A backside or rear surface of the display 151 may also have the light-transmissive type configuration. In this configuration, a user may be able to see an object located behind the terminal body through the display 151.

Moreover, two or more displays 151 may be provided on the mobile terminal 100. For example, a plurality of displays may be provided on a single surface of the terminal 100 by being integrated into one body. Alternatively, each of a plurality of displays may be provided on different surfaces of the terminal 100.

If the display 151 and a sensor for detecting a touch action (hereafter a touch sensor) are configured in a mutual-layered structure (hereafter a touch screen), the display 151 may be used as an input device as well as an output device. For example, the touch sensor may include a touch film, a touch sheet, a touchpad or the like. The touch sensor may convert pressure applied to a specific portion of the display 151, or a variation of electrostatic capacitance generated at a specific portion of the display 151, into an electric input signal. The touch sensor may be configured to detect a pressure of a touch as well as a position, size and duration of the touch.

If a touch input is provided to the touch sensor, signal(s) corresponding to the touch input may be transferred to a touch controller. The touch controller may process the signal(s), then transfer the corresponding data to the controller 180. The controller 180 may then determine the location of the touch on the display 151.

The proximity sensor 141 may be provided within the mobile terminal 100 and may be enclosed by the touch screen or positioned around the touch screen. The proximity sensor 141 may detect a presence of an object that may be approaching or is near a prescribed detecting surface. The proximity sensor 141 may use an electromagnetic field strength or infrared ray to remotely detect objects without the need for physical contact. In addition to detecting a presence of an object, the proximity sensor 141 may also sense a non-presence of an object. Moreover, the proximity sensor 141 may have a longer lifespan and increased durability than a contact type sensor, and may also have a greater number of applications than the contact type sensor.

The proximity sensor 141 may include one of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor, or the like. If the touch screen is an electrostatic type, the proximity sensor 141 may detect proximity of a pointer by detecting a variation of an electric field corresponding to the proximity of the pointer. In this way, the touch screen (touch sensor) may be implemented as a the proximity sensor.

An action in which a pointer approaches the touch screen without contacting the touch screen may be called a proximity touch. An action in which a pointer actually touches the touch screen may be called a contact touch. For example, when a pointer is used to proximity-touch the touch screen, the location of the touch on the touch screen may be determined to be a position on the touch screen that horizontally corresponds to the position of the pointer when the pointer detected by the proximity sensor 141.

The proximity sensor 141 may detect a proximity touch and/or a proximity touch pattern (e.g., a proximity touch distance, proximity touch duration, a proximity touch position, a proximity touch shift state, etc.). Information corresponding to the detected proximity touch action and/or the detected proximity touch pattern may be outputted to the touch screen.

The audio output module 152 may output audio data that is received from the wireless communication unit 110 in a call signal reception mode, a call mode, a recording mode, a voice recognition mode, a broadcast receiving mode and/or the like.

The audio output module 152 may output audio data stored in the memory 160. The audio output module 152 may output an audio signal relevant to a function (e.g., a call signal receiving sound, a message receiving sound, etc.) performed by the mobile terminal 100. The audio output module 152 may include a receiver, a speaker, a buzzer and/or the like.

The alarm unit 153 may output a signal for announcing an occurrence of an event in the mobile terminal 100. An event occurring in the mobile terminal 100 may include one of a call signal reception, a message reception, a key signal input, a touch input and/or the like. The alarm unit 153 may output a signal for announcing an occurrence of an event by way of a vibration or the like as well as a video signal or an audio signal. The video signal may be outputted via the display 151. The audio signal may be outputted via the audio output module 152. Moreover, the display 151 or the audio output module 152 may be a part of the alarm unit 153.

The haptic module 154 may provide various haptic effects that can be sensed by a user. Vibration is an example of a haptic effect generated by the haptic module 154. The intensity and pattern of the vibration generated from the haptic module 154 may be controllable. For example, multiple vibrations that differ from each other may be synthesized to be outputted together or outputted sequentially.

The haptic module 154 may generate various haptic effects including a vibration, an effect caused by a stimulus such as a pin array that moves vertically along a skin surface, an air jet via an outlet, an air suction via inlet, a skim on a skin surface, a contact by an electrode, an electrostatic power, a hot/cold sense reproduction using an endothermic or exothermic device, or other appropriate methods of producing haptic effects.

The haptic module 154 may provide the haptic effect via direct contact. The haptic module 154 may enable a user to experience the haptic effect via sensations, on, for example, a finger, an arm and/or the like. Two or more haptic modules 154 may also be provided in the mobile terminal 100.

The memory 160 may store a program for execution by the controller 180. The memory 160 may temporarily store input/output data (e.g., phonebook, message, still picture, moving picture, etc.). The memory 160 may store data used to generate various patterns of vibration or sound associated with a touch input on the touch screen.

The memory 160 may include at least one of a flash memory, a hard disk, a multimedia card micro type memory, a card type memory (e.g., SD memory, XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, and/or the like. The mobile terminal 100 may operate in association with a web storage that performs a storage function of the memory 160 on the Internet.

The interface unit 170 may play provide access to external devices connected to the mobile terminal 100. The interface unit 170 may receive data from an external device. The interface unit 170 may also be supplied with power which may then be delivered to elements within the mobile terminal 100. The interface unit 170 may enable data to be transferred to an external device from within the mobile terminal 100. The interface unit 170 may include a wire/wireless headset port, an external charger port, a wire/wireless data port, a memory card port, a port for coupling to a device having an identity module, an audio input/output (I/O) port, a video input/output (I/O) port, an earphone port and/or the like.

The identity module may be a chip or card that stores various kinds of information to authenticate a user of the mobile terminal 100. The identity module may include a user identity module (UIM), a subscriber identity module (SIM), a universal subscriber identity module (USIM) and/or the like. A device provided with the above identity module (hereafter an identity device) may be manufactured in the form of a smart card. The identity device may be connected to the mobile terminal 100 via the corresponding port.

The interface unit 170 may also supply power to the mobile terminal 100 from a cradle that is connected to the mobile terminal 100. The interface unit 170 may also deliver various command signals, which are inputted from the cradle by a user, to the mobile terminal 100. The supplied power of the various command signals received through the cradle may also serve as a signal for recognizing that the mobile terminal 100 is correctly seated in the cradle.

The controller 180 may control overall operations of the mobile terminal 100. For example, the controller 180 may perform control and processing relevant to a voice call, a data communication, a video conference and/or the like. The controller 180 may have a multimedia module 181 for multimedia playback. The multimedia module 181 may be implemented within the controller 180 or may be configured separate from the controller 180. The controller 180 may also perform pattern recognition processing that recognizes a handwriting input on the touch screen to be a character and/or a picture drawing input on the touch screen to be a particular image.

The power supply unit 190 may receive power from an external or internal power source. The power supply unit 190 may supply the power required for operations of the respective components of the mobile terminal 100 under the control of the controller 180.

Embodiments of the present disclosure explained in the following description may be implemented within a recording medium that may be read by a computer or a computer-like device using software, hardware or a combination thereof.

The embodiments as broadly described herein may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors and other appropriate electrical components for performing the disclosed functions. In some cases, the embodiments may be implemented by the controller 180.

The embodiments may also be implemented with separate software modules, such as procedures and functions, each of which may perform one or more of the functions and operations described herein. Software codes may be implemented with a software application written in any suitable programming language and may be stored in memory such as the memory 160, and may be executed by a controller or processor, such as the controller 180.

Figure 2A:
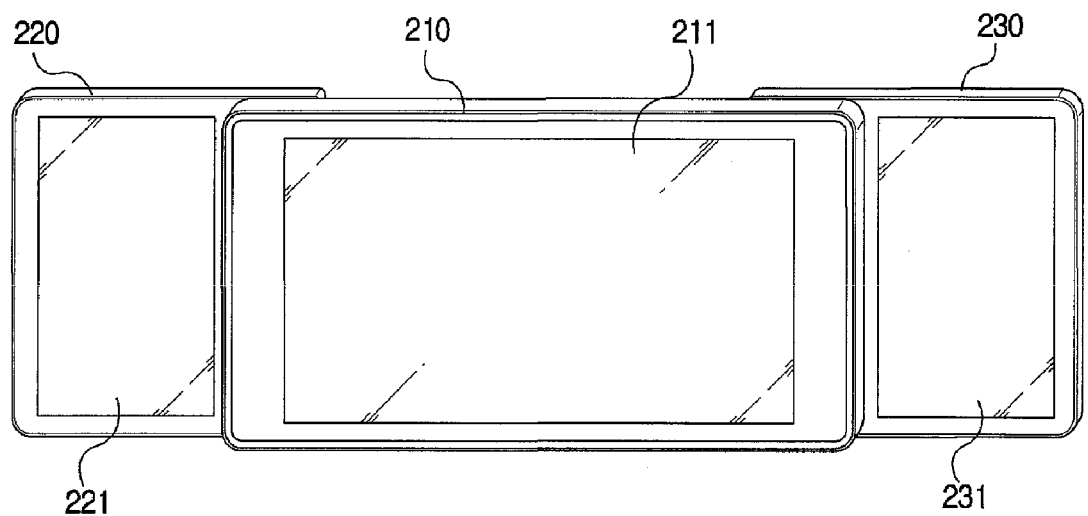
FIGS. 2A, 2B and 2C are perspective views of a mobile terminal according to an embodiment of the present disclosure.
Figure 2B:
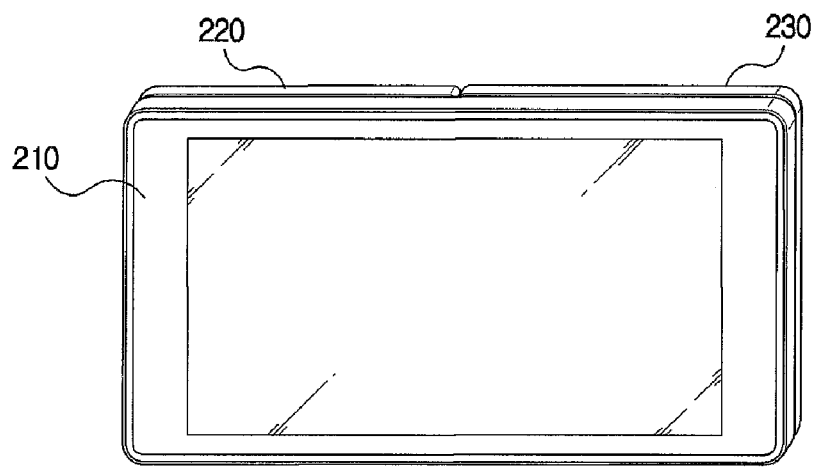
Figure 2C:
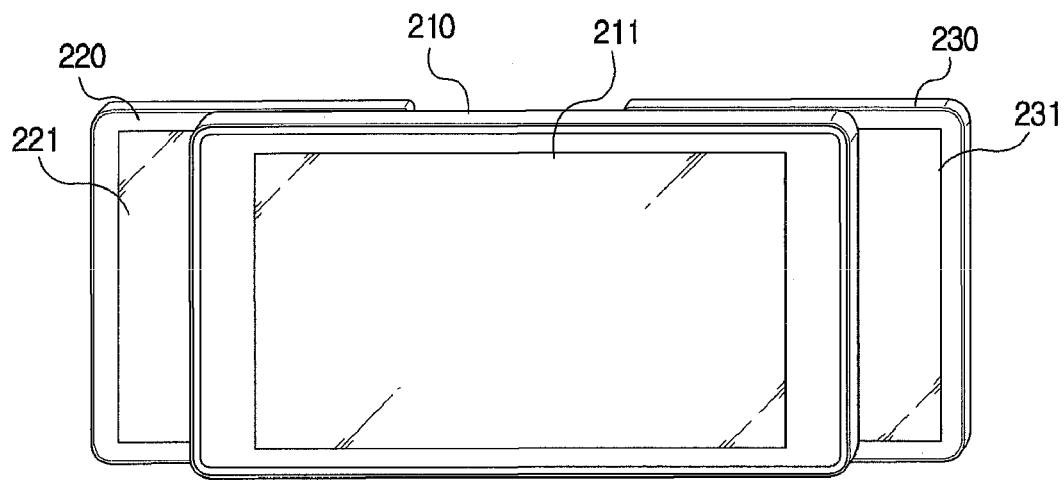

FIGS. 2A, 2B and 2C are perspective views of a mobile terminal according to an embodiment of the present disclosure. Referring to FIG. 2A, a mobile terminal 100 according to an embodiment of the present disclosure may include a main body 210 disposed at an upper surface thereof with a main display 211, a first sliding unit 220 (sliding assembly) slidably disposed at a lower surface of the main body 210 and disposed with a first sub-display 221, a second sliding unit 230 (sliding assembly) slidably disposed on the main body 210 and disposed with a second sub-display 231. The second sliding unit 230 may be arranged symmetrically to the first sliding unit 220.

FIG. 2B illustrates a state where the first and second sliding units 220, 230 are closed. The closed state of the first and second sliding units 220, 230 serves to integrate the first and second sliding units 220, 230 with the main body 210. In the closed state, the first and second sliding assemblies 220, 230 may be positioned adjacent to one another such that the mobile terminal 100 takes the same shape as that of a bar type mobile terminal.

FIG. 2C illustrates a perspective view of the mobile terminal 100 in which the first sliding unit 220 and the second sliding unit 230 are in a first position state (semi-open state). While FIG. 2A illustrates a completely opened state of the sliding units 220, 230 of the mobile terminal 100, FIG. 2C illustrates a semi-opened (half-opened) state of the sliding units 220, 230 of the mobile terminal 100.

The first sliding unit 220 and the second sliding unit 230 may be operated independently. For example, only one of the first or second sliding units 220, 230 may be opened to be in the semi-open state or completely opened state. As described in further detail hereinbelow, the displays which are open (visible to the user) may be controlled to provide the information as predetermined by the user or corresponding to the applications which are in operation.

As illustrated, the first and second sub-displays 221, 231 may be partially exposed. The mobile terminal may further include a stopper in order to maintain the semi-opened state. The stopper may be formed on at least one of the main body 210, the first sliding unit 220, and the second sliding unit 230 to stop at least one of the first or second sliding units 220, 230 from sliding from the first position.

The mobile terminal may further include a sliding signal generating device configured to generate a first signal, if at least one of the first sliding unit and the second sliding unit slides to a first position (semi-open state), and to generate a second signal if at least one of the first sliding unit and the second sliding unit slides to a second position (completely open state). Various types of menus that may be displayed using the first and second signals are described in detail with reference to FIGS. 5A-7B hereinbelow.

Accordingly, the first and second sub-displays 221, 231 may improve the user interface of the mobile terminal 100 by providing for a larger viewing area. In various embodiments as described herein below, the sub-displays 221, 231 may display various menus corresponding to an application currently running on the mobile terminal 100. In another embodiment, the first and second sub-displays 221, 231 may be used to enlarge a viewing area for a particular image. For example, an image may be configured to span the main display 211 and the first and/or second sub-displays 221, 231 to effectively enlarge the display screen.

In yet another embodiment, an image displayed on the main display 211 or the sub-displays 221, 231 may be moved or swapped between the displays. For example, when the displays are touch screens, a user may select an image on the main display 211 by touching the image for a predetermined period of time. Once selected, the user may drag the image towards one of the sub-displays 221, 231. The selected image may then be displayed on the desired sub-display. An image originally displayed on the sub-displays 221, 231 may then be displayed on the main display 210.

Figure 3A:
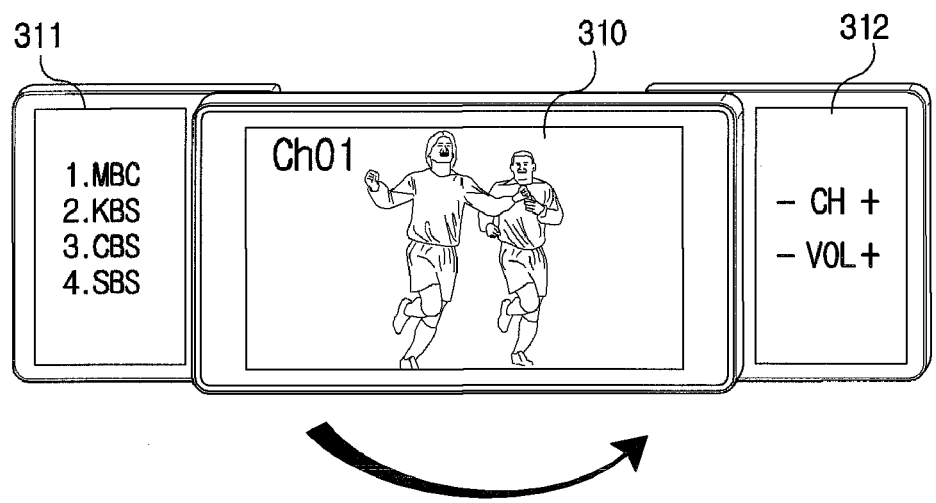
FIGS. 3A and 3B illustrate a change in displayed images corresponding to a change in orientation of a mobile terminal according to an embodiment of the present disclosure.
Figure 3B:
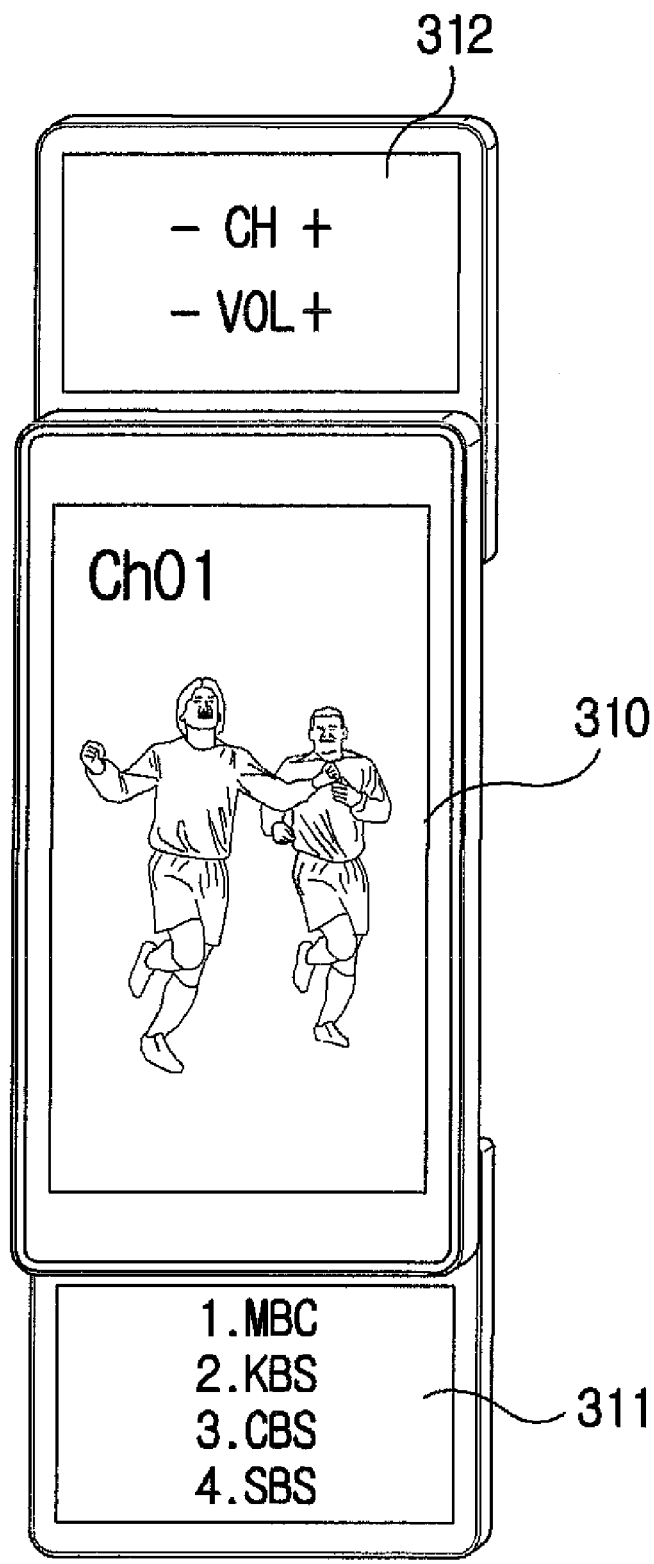

FIGS. 3A and 3B illustrate a change in displayed images corresponding to a change in orientation of a mobile terminal according to an embodiment of the present disclosure. FIG. 3A illustrates the mobile terminal 100 in a horizontally opened state according to an embodiment of the present disclosure. As illustrated, the main display may be displayed with a broadcasting screen 310, the first sub-display may be displayed with a broadcasting channel related menu screen 311, and the second sub-display may be displayed with a channel change icon and a volume control menu screen 312.

Simply for ease of explanation, the mobile terminal 100 is described herein as having a first sub-display and a second sub-display that are touch screens. The main display may also be a touch screen in some cases. However, the embodiments are not limited thereto, and the mobile terminal 100 may be provided with other types displays or input interfaces, for example, a non-touch screen LCD display, a QWERTY keypad, or a combination therein.

Referring to FIG. 3B, when the orientation of the mobile terminal 100 is changed to be vertical while in an opened state, the controller 180 detects the change in orientation of the mobile terminal 100 via the sensing unit 140. The controller 180 then may change the display of the moving picture 310 and menu screens 311, 312 displayed on the main display, the first sub-display and the second sub-display.

For example, the controller 180 may change the orientation of the moving picture 310 and the menu screens 311, 312 displayed on the main display, the first sub-display and the second sub-display to correspond to the orientation of the mobile terminal 100 such that a user may continue to view texts on the moving picture and the menu screens. The user may, therefore, easily check the menus and view the moving picture 310 even when the orientation of the mobile terminal 100 is changed. Moreover, when the orientation is changed when in a closed state, or when only one sub-display is in an open or semi-open state, the orientation of those displays that are active may be adjusted to correct the orientation corresponding to the orientation of the mobile terminal 100.

Figure 4:
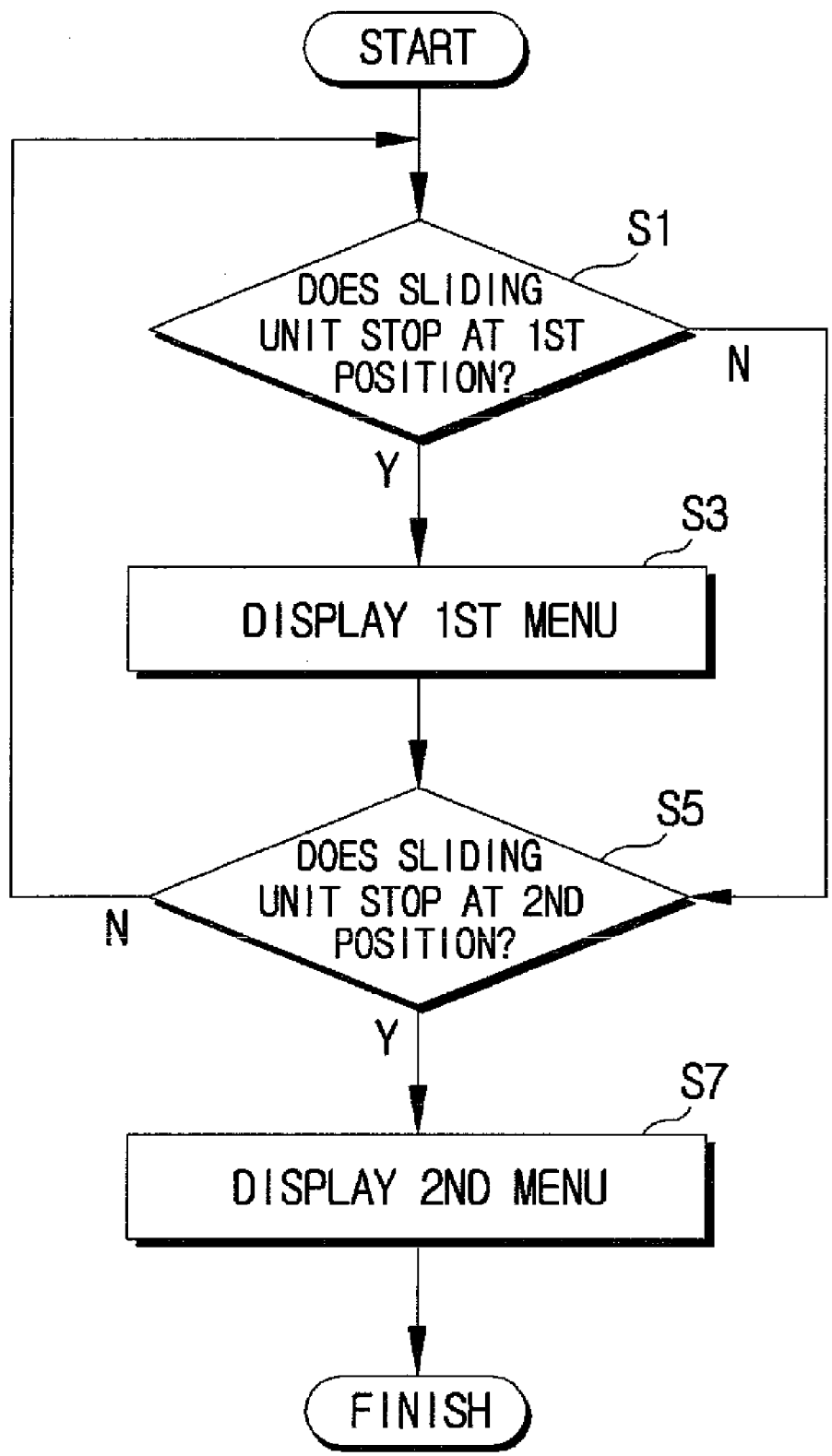
FIG. 4 is a flowchart of a method for displaying a menu in a mobile terminal according to an embodiment of the present disclosure.

A method for displaying a menu in the mobile terminal of FIGS. 2A-3B will be described with reference to FIG. 4. FIG. 4 is a flowchart of a method for displaying a menu in a mobile terminal according to an embodiment of the present disclosure.

Referring to FIG. 4, the controller 180 may monitor whether at least one of the first or second sliding units 220, 230 of the mobile terminal has been moved to the first position (semi-open state), in step S1. A device such as a photo coupler or a switch may be used to monitor whether the first or second sliding units 220, 230 are in the semi-opened state. When the first or second sliding units 220, 230 are situated at the first position, the first menu associated with an application program may be displayed on at least one of the main display 211 and the sub-displays 221, 231, in step S3. For example, a camera may be activated to cause a preview screen to be displayed on the main display 210, and cause an input screen having control commands for the camera to be displayed on the sub-displays 220, 230.

Meanwhile, the controller 180 may monitor whether at least one of the first or second sliding units 220, 230 of the mobile terminal 100 is moved to the second position (completely opened state), in step S5. A device such as a photo coupler or a switch may be employed to monitor whether the first or second sliding units 220, 230 are in the completely opened state. When the first or second sliding units 220, 230 are situated at the second position, the second menu associated with the application program may be displayed on at least one of the main display 211 and the sub-displays 221, 231, in step S7. For example, when a text message preparation menu is executed, the main display 210 may be displayed with a text message preparation screen, and the sub-displays 220, 230 may be displayed with a text message input screen.

Moreover, as will be described in further detail hereinbelow, each position of the first and second sliding units 220, 230 may be associated with a separate application program, thereby automatically updating the main and sub-displays to display information associated with each respective application. Alternatively, each position of the first and second sliding units 220, 230 may be associated with a different menu displays that are associated with the same application.

Figure 5A:
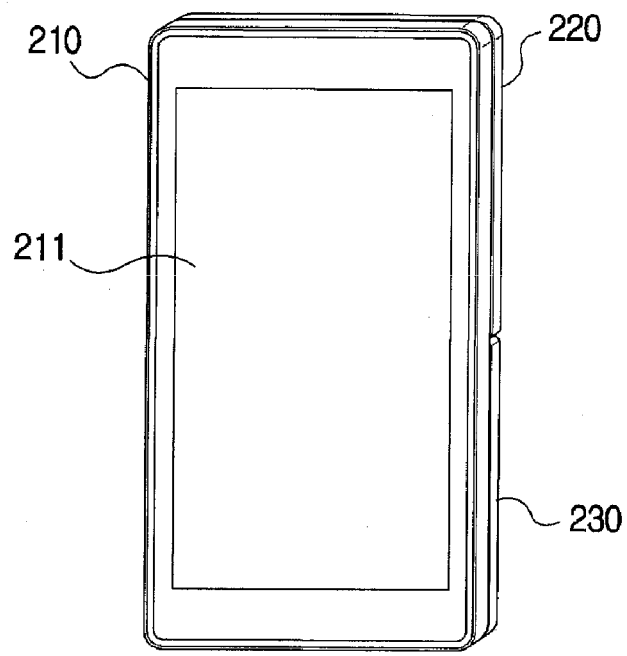
FIGS. 5A, 5B and 5C illustrate a display in a mobile terminal in a vertical position according to an embodiment of the present disclosure.
Figure 5B:
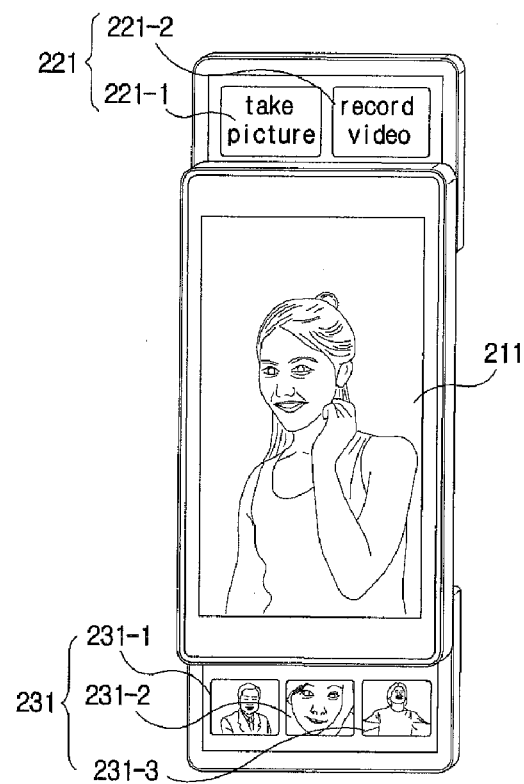
Figure 5C:
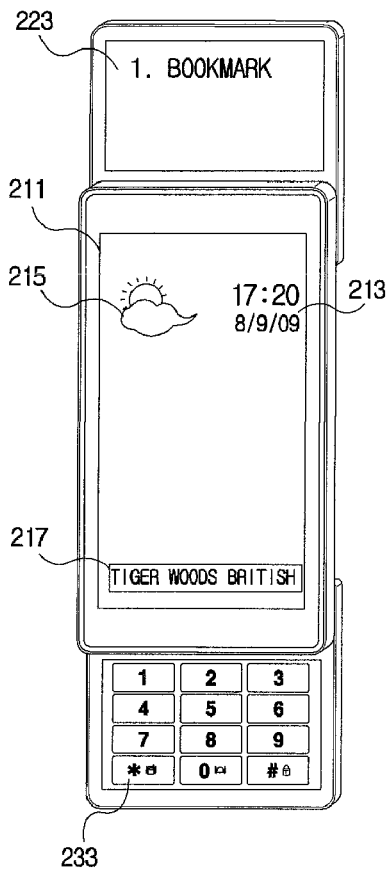

FIGS. 5A, 5B and 5C illustrate a display of menus in a mobile terminal in a vertical position according to an embodiment of the present disclosure. FIG. 5A illustrates a mobile terminal 100 that is closed. As shown in FIG. 5A, the main display 211 is disposed on the main body 210, and the first and second sliding units 220, 230 may be configured to be slidable from both the top and bottom sides of the main body. The first and second sliding assemblies 220, 230 may be provided with a first and second sub-displays 223, 233, respectively.

When the first and second sliding units 220, 230 moved to the first position, being semi-opened, from a closed state, the mobile terminal may enter a camera mode as shown in FIG. 5B. For example, the controller 180 may drive a built-in camera 121 to execute a camera menu and may cause a preview image obtained from the camera to be displayed on the main display 211 when the mobile terminal 100 is in a semi-opened state. The controller 180 may also cause the first and second sub-displays 221, 231 to display camera control icons and a thumbnail of an image pre-stored in the memory, respectively. That is, as shown in FIG. 5B, the first sub-display 221 may display a take picture icon 221-1 and a record video icon 221-2, and the second sub-display 231 may display thumbnail images 231-1, 231-2, 231-3 in a gallery menu.

When the first and second sliding units are moved to the second position to be in an opened state from the closed state, the mobile terminal may enter a wallpaper mode as illustrated in FIG. 5C. For example, the controller 180 may detect an open state of the mobile terminal 100, and may turn on the main display 211 to display widgets thereon. The widgets displayed on the main display 211 may include a watch widget 213, a weather widget 215, a news widget 217, or other appropriate widgets or displays. Moreover, the controller 180 may cause the first sub-display to display a bookmark menu 223, and the second sub-display to display a number keypad 233.

As noted above, the mobile terminal 100 may be configured to automatically enter the camera mode when put into the semi-open state, thereby dispensing with the need for activation of a camera mode entry key. Although the mobile terminal of this embodiment is disclosed as being configured to automatically enter a camera mode under a semi-opened state and a wallpaper mode under an opened state, the present disclosure is not limited thereto. It should be apparent that an entry mode may be assigned by a user for each state of the sliding units according to user preferences.

For example, when the mobile terminal 100 is configured to be in the open state, the camera mode may be maintained and the menus displayed on the sub-displays may be updated to provide additional information. Moreover, the mobile terminal 100 may be configured to launch a different application for each configuration of the sliding assemblies. For example, when only the first sliding assembly is opened to the semi-open state, a first application (e.g. camera mode) may be launched. When the first sliding assembly is opened to the completely opened state, a second application (e.g. text mode) may be launched. When one sliding assembly is moved to a semi-open state, and the other sliding assembly is moved to a completely open state, yet another application (e.g. video mode) may be launched. Alternatively, merely the menus displayed may be updated when the state of the sliding assemblies are changed.

Figure 6A:
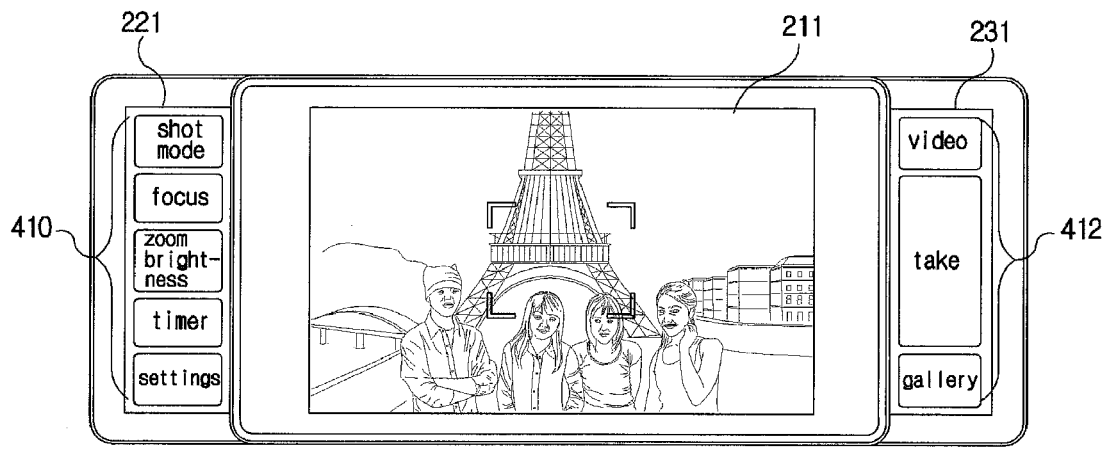
FIGS. 6A, 6B and 6C illustrate a display in a mobile terminal in a semi-open state in a camera mode according to an embodiment of the present disclosure.
Figure 6B:
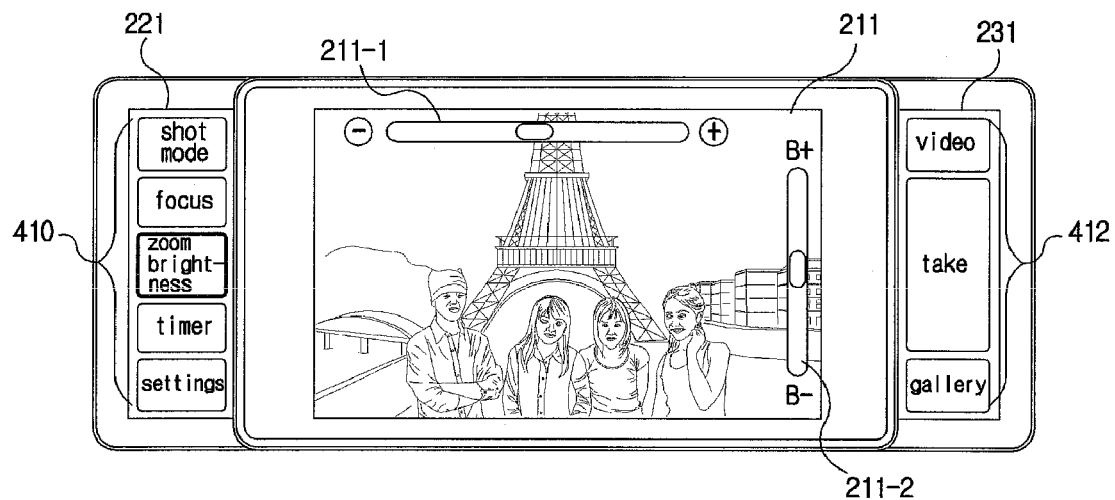
Figure 6C:
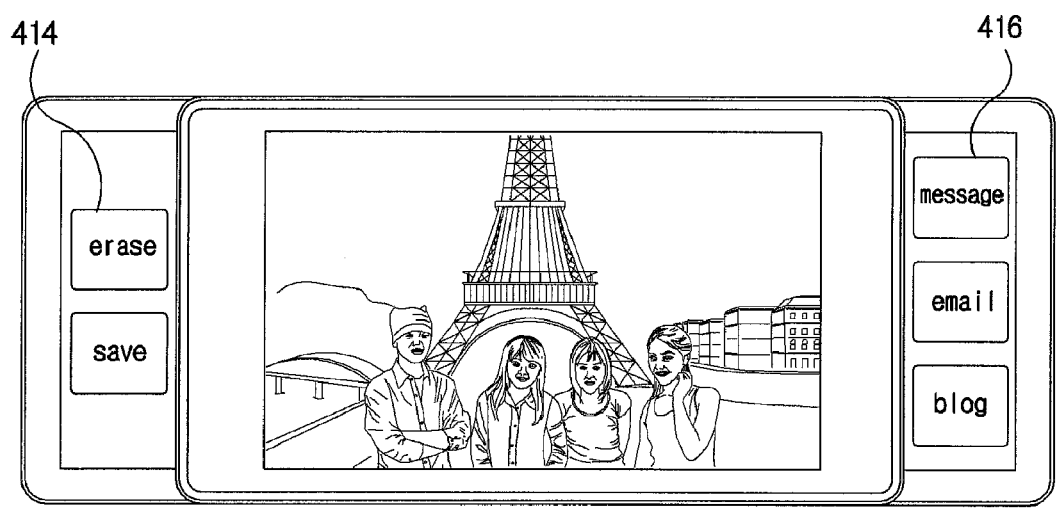

FIGS. 6A, 6B and 6C illustrate a display of menus in a mobile terminal in a semi-open state in a camera mode according to an embodiment of the present disclosure. As illustrated in FIG. 6A, when the first and second sliding units move to the first position to enter a camera mode, the main display 211 may display an image (a preview image) obtained or captured by the camera. The first sub-display 221 may display a photograph set-up menu 410 (a camera set-up menu) including a shot mode icon, a focus icon, a zoom/brightness icon, a timer icon and a set-up (settings) icon. The second sub-display 231 may display a photograph executing menu 412 (a camera control menu) including a video icon, a photograph (take) icon and a gallery icon.

When the shot mode icon is selected, the user may select one of the shot modes including a night view mode, a twilight mode, a candlelight mode or an indoor mode. When the focus icon is selected, the user may select one of a candlelight focus or an entire focus modes. When the zoom/brightness icon is selected, a zoom bar 211-1 and a brightness bar 211-2 may be displayed on the main display 211, as shown in FIG. 6B, whereby the user may manipulate the image to perform a zoom function and brightness adjustments. When the timer icon is selected, the user may set up a timer time and set up a timer function. When the settings icon is selected, the user may set up other camera functions that may be programmable through the photograph settings icon.

When the video icon is selected, the user may change the mode to a moving picture photograph mode to record a moving picture. When the photograph (take) icon is selected, a still image may be captured or a video may be recorded. When the gallery icon is selected, image files stored in the memory 160 may be displayed on the main display 211, details of which will be described with reference to FIGS. 8A and 8B.

Referring to FIG. 6C, when the user selects the photograph icon (take) to capture a still image while the sliding units are in the semi-opened state, the captured still image may be displayed on the main display, the first sub-display displays icons (i.e., erase icon and save icon) capable of storing and deleting (erasing) the still image, and the second sub-display displays icons (i.e., text message icon, email icon and blog icon) capable of transmitting the still image.

When the text message icon is selected, an MMS text message preparation screen capable of transmitting the displayed still image in a text message may be displayed on the main display. When the email icon is selected, an email preparation screen capable of transmitting the displayed still image in email message may be displayed on the main display. When the blog icon is selected, a screen for uploading the still image on a pre-set blog may be displayed on the main display.

Figure 7A:
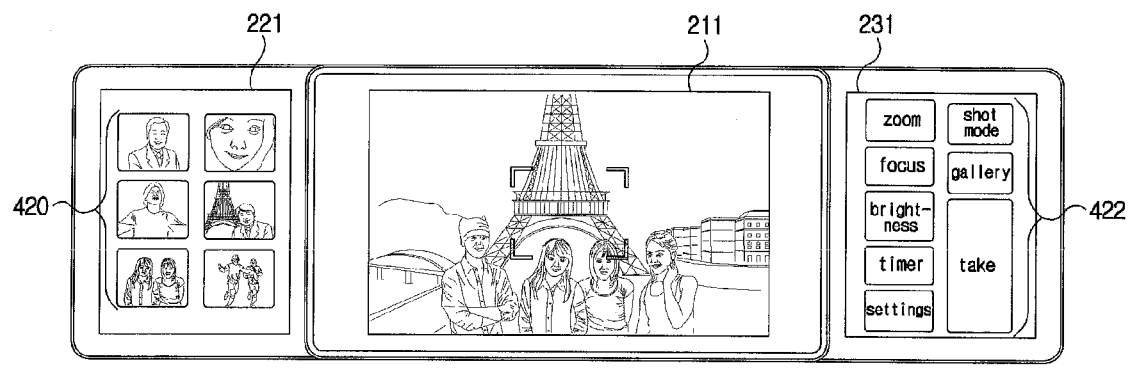
FIGS. 7A and 7B illustrate a display of menus on a mobile terminal in a completely open state according to an embodiment of the present disclosure.
Figure 7B:
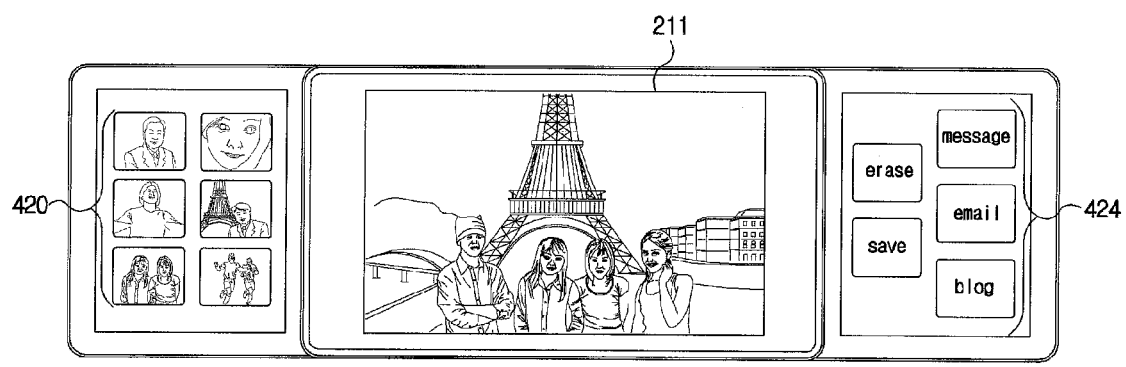

FIGS. 7A and 7B illustrate a display of menus on a mobile terminal in a completely open state according to an embodiment of the present disclosure. When the controller 180 of the mobile terminal 100 determines that the sliding units are fully opened, the controller 180 may drive the camera 121 to display the image obtained from the camera on the main display 211. The controller 180 may also cause the first sub-display 221 to display images 420 of the gallery menu in a thumbnail format, and cause the second sub-display 231 to display a photograph control menu 422.

The photograph control menu 422 may include the photograph set-up menu and photograph executing menu according to the third embodiment. The images 420 displayed on the first sub-display 221 may be still images generated in a continuous photographing format during continuous photographing.

For example, when the photograph (take) icon is selected to capture a still image as shown in FIG. 7B, the still images may be displayed on the main display 211, and at the same time, still image control icons may be displayed on the second sub-display. The still image control icons displayed on the second sub-display may include the still image transmission icon and still image storage/deletion icon according to the third embodiment. If the user performs continuous photographing, the continuously photographed images may be displayed on the first sub-display in the thumbnail format, and a control menu 424 to control the captured images may be displayed on the second sub-display, whereby the user may select a desired still image and conveniently store or transmit the second still image.

Figure 8A:
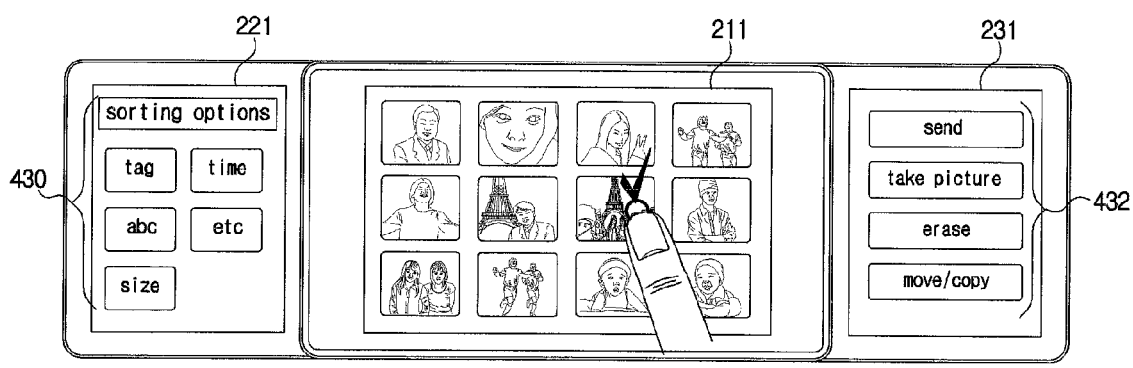
FIGS. 8A and 8B illustrate a display of a gallery menu on a mobile terminal according to an embodiment of the present disclosure.
Figure 8B:
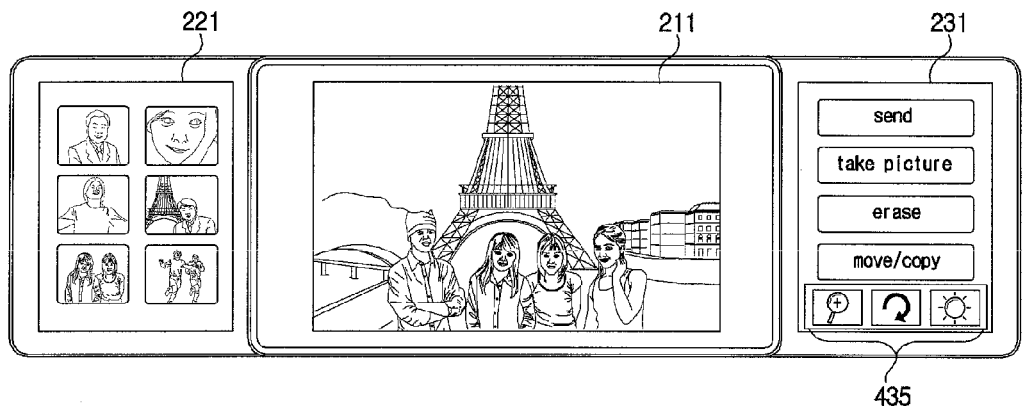

FIGS. 8A and 8B illustrate a display of a gallery menu on a mobile terminal according to an embodiment of the present disclosure. In this embodiment, the mobile 100 enters the gallery mode when the sliding units are fully opened. When the mobile terminal 100 enters the gallery mode as the sliding units are completely opened, the mobile terminal may display a gallery menu. Here, the main display 211 may display a plurality of thumbnail images, the first sub-display 221 may display a classification (sorting) option menu 430, and the second sub-display display an image related control menu 432, as shown in FIG. 8A. The classification option menu 430 may include a tag classification icon, an initial (abc) classification icon, a time classification icon and a size classification icon. The image related control menu 432 may include a transmission (send) icon, a photograph icon (take picture), a erase icon, and move/copy icon.

When the tag classification icon is selected, images may be classified using tag information displayed on the main display. When the initial (abc) classification icon is selected, the images displayed on the main display may be classified and displayed in alphabetical order according to the file name. The display may also be classified and displayed in other languages, for example, according to the Korean Alphabet. When the time classification icon is selected, the images displayed on the main display may be classified and displayed in the order of recent generation or timestamps. When the size classification icon is selected, the images displayed on the main display may be sorted and displayed according to size.

When the transmission (send) icon is selected, a transmission screen (MMS preparation screen or email preparation screen) for transmitting an image may be displayed on the main display 211. When the photograph (take picture) icon is selected, the process may return to the screen in FIG. 7A to allow the user to capture still images or videos. When the erase icon is selected, the selected thumbnail is deleted. When the move/copy icon is selected, the selected thumbnail may be copied or moved to another folder.

Moreover, when one of the thumbnails is selected as shown in FIG. 8A, the selected image may be displayed on the main display 211, the thumbnails displayed on the main display 211 may be displayed on the first sub-display 221, and a display change menu 435 may be displayed on the second sub-display 231 in an overlay format, as shown in FIG. 8B. The display change menu 435 may include a second sub-display zoom icon, a rotation icon and a brightness change icon. The display of images selected may be changed through the display change menu 435.

Figure 9A:
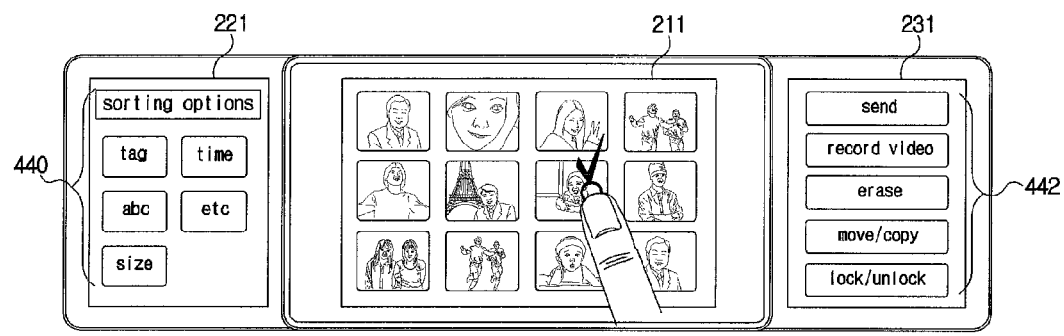
FIGS. 9A and 9B illustrate a display of a video gallery menu in a mobile terminal according to an embodiment of the present disclosure.
Figure 9B:
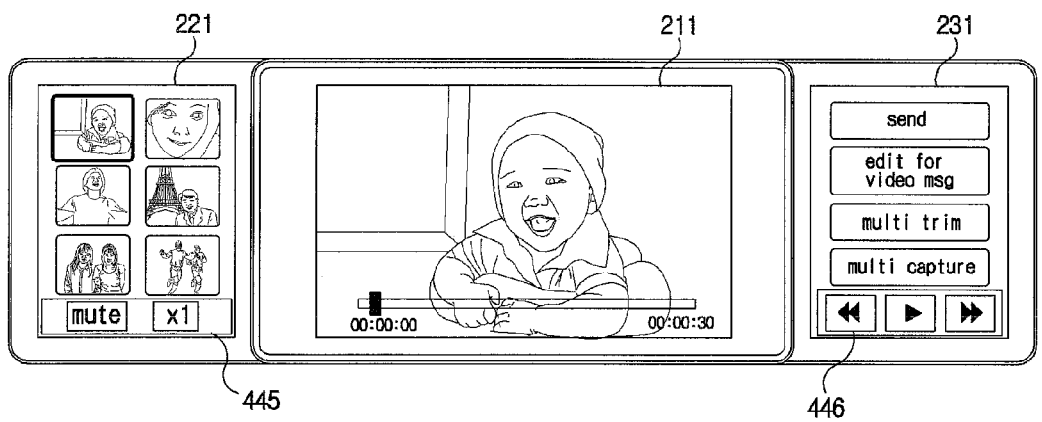

FIGS. 9A and 9B illustrate a display of a video gallery menu in a mobile terminal according to an embodiment of the present disclosure. In this embodiment, the mobile terminal 100 may enter a video gallery mode when the sliding units are in a completely opened state. As shown in FIG. 9A, when the mobile terminal 100 enters the video gallery mode when in a completely opened state, a video gallery menu may be displayed. Here, the main display 211 may display a plurality of thumbnail images, the first sub-display 221 may display a classification option menu 440 and the second sub-display may display a moving picture related control menu 442. Each thumbnail may represent a video file (moving picture file). The classification option menu 440 may include a tag classification icon, an initial (abc) classification icon, a time classification icon, and a size classification icon. The moving picture related control menu 442 may include a transmission (send) icon, a photograph (record video) icon, a erase icon, and a move/copy icon.

When the tag classification icon is selected, images may be classified using the tag information displayed on the main display. When the initial (abc) classification icon is selected, the images displayed on the main display may be classified and displayed in alphabetical order according to the file name. When the time classification icon is selected, the images displayed on the main display may be classified and displayed in the order of recent generation or timestamp. When the size classification icon is selected, the images displayed on the main display may be sorted and displayed according to size.

When the transmission (send) icon is selected, a transmission screen (MMS preparation screen or email preparation screen) for transmitting a video selected among the thumbnail images may be displayed on the main display. When the photograph (record video) icon is selected, the mobile terminal 100 may display the screen as shown in FIG. 9A to allow the user to photograph still images or to record moving pictures. When the deletion or erase icon is selected, the selected thumbnail may be deleted. When the move/copy icon is selected, the selected thumbnail may be copied or moved to another folder.

Moreover, when one of the thumbnails is selected as shown in FIG. 9A, the selected moving picture may be displayed on the main display 211 as shown in FIG. 9B, the thumbnail images displayed on the main display may be displayed on the first sub-display 221, and reproduction control (playback control) menus 445, 446 may be displayed at a lower end of the first and second sub-displays 221, 231 in the overlay method. The reproduction control menus 445, 446 may include a play icon, a rewind icon, a fast forward icon, a mute icon and a zoom icon. The reproduction or playback of moving pictures on the main display 211 may be controlled by the reproduction control menu 445, 446.

Figure 10A:
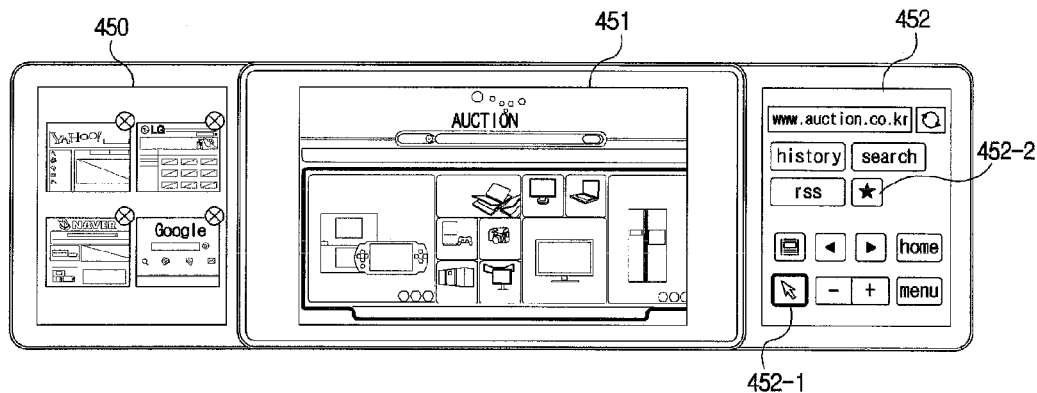
FIGS. 10A, 10B and 10C illustrate a display of menus including a web browser in a mobile terminal according to an embodiment of the present disclosure.
Figure 10B:
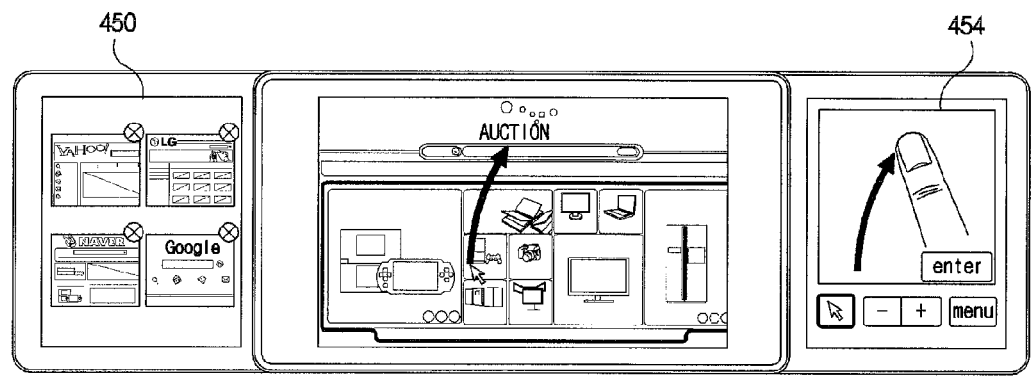
Figure 10C:
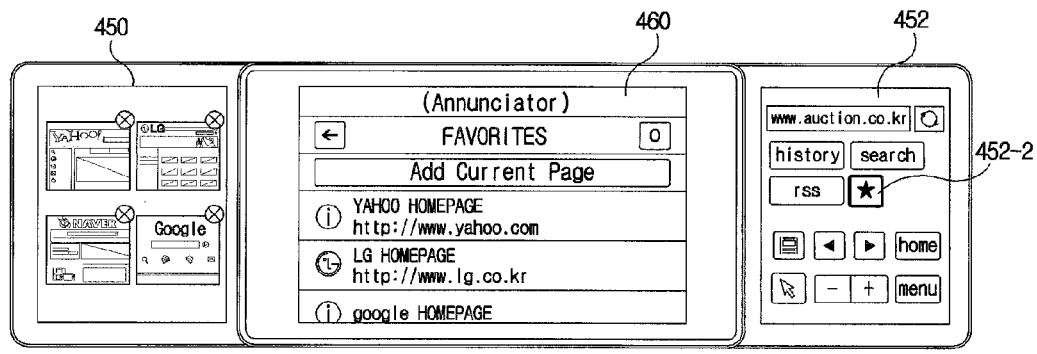

FIGS. 10A, 10B and 10C illustrate a display of menus including a web browser in a mobile terminal according to an embodiment of the present disclosure. In this embodiment, an Internet web browser may be executed when the sliding units are fully opened.

When a program that requires an Internet connection is executed while the sliding units are completely opened, the main display may display a web page screen 451, the first sub-display may display a visited web page (browser history) thumbnail 450, and the second sub-display may display a web page control menu 452, as shown in FIG. 10A.

The user may quickly and easily launch a web page previously visited using the visited web page thumbnail 450 displayed on the first sub-display. Further, the second sub-display may display a web page control menu 452 that may include a touch pad icon 452-1 and a bookmark icon 452-2. As illustrated in FIG. 10A, the web page control menu 452 may further include a conventional web page control icon used in various web browsers, for example, Internet Explorer, Safari, or the like.

When the user selects the touch pad icon 452-1, the second sub-display may display a touch pad 454 that controls a cursor on the main display, as shown in FIG. 10B. For example, a portion of the control menu as illustrated in FIG. 10A may be deleted, and replaced with an area that functions as a touch pad. Therefore, as illustrated FIG. 10B, when the user touches and moves the pointing device on the touch pad, the cursor displayed on the main display may be moved accordingly.

When the user selects the bookmark icon 452-2, the main display may display a pre-set web address list (favorites list) 460, as illustrated in FIG. 10C. The user may conveniently connect to a desired webpage by selecting a URL from the web address list.

Figure 11A:
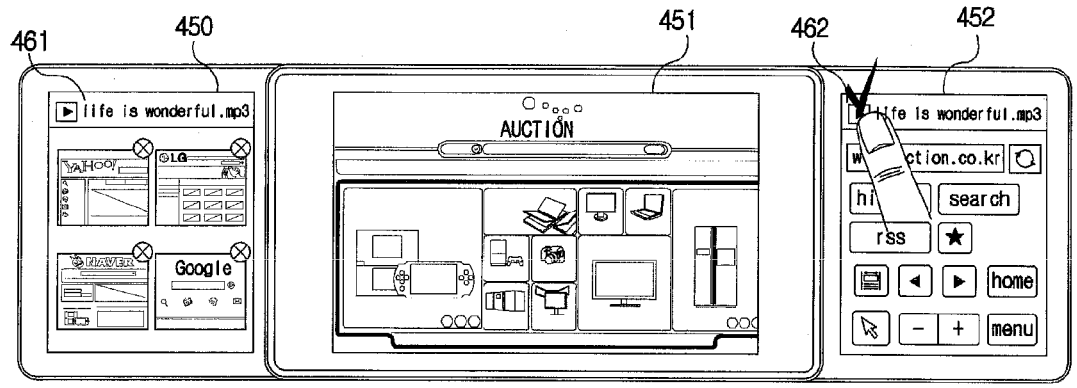
FIGS. 11A and 11B illustrate a display of multiple menus in a mobile terminal according to an embodiment of the present disclosure.
Figure 11B:
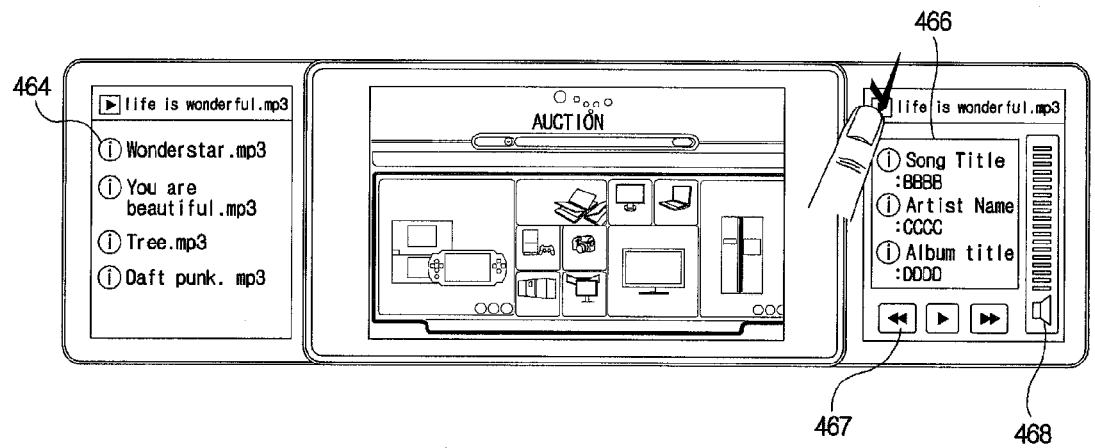

FIGS. 11A and 11B illustrate a display of multiple menus in a mobile terminal according to an embodiment of the present disclosure. In this embodiment, an Internet web browser is executed concurrently when a BGM (Background Music) program when the sliding units are fully opened.

When the sliding units are fully opened, the mobile terminal 100 may enter the Internet browser mode. Here, the main display 211 may display a web page screen 451, the first sub-display is may display a visited web page thumbnail 450 and the second sub-display is may display a web page control menu 452, as illustrated in FIG. 10A. If the BGM program is executed while the mobile terminal 100 is in the Internet browser mode, BGM information 461, 462 may be displayed at an upper sides of the first and second sub-displays. The BGM information 461, 462 may be file names of audio files being played.

Simply for ease of discussion, this embodiment describes the BGM information positioned at both upper sides across the first and second sub-displays, however, the embodiment is not limited thereto. The BGM information may be displayed on one of the first and second sub-displays or may be displayed on the main display.

In this embodiment, when the BGM information is selected, the first sub-display may display an audio file list 464, and the second sub-display may display music file control icons 467, 468 and detailed information 466. The user may control playback of an audio file through the audio file list 464, the music file control icon 467, 468 and the detailed information 466 to select or play a desired audio file.

Figure 12:
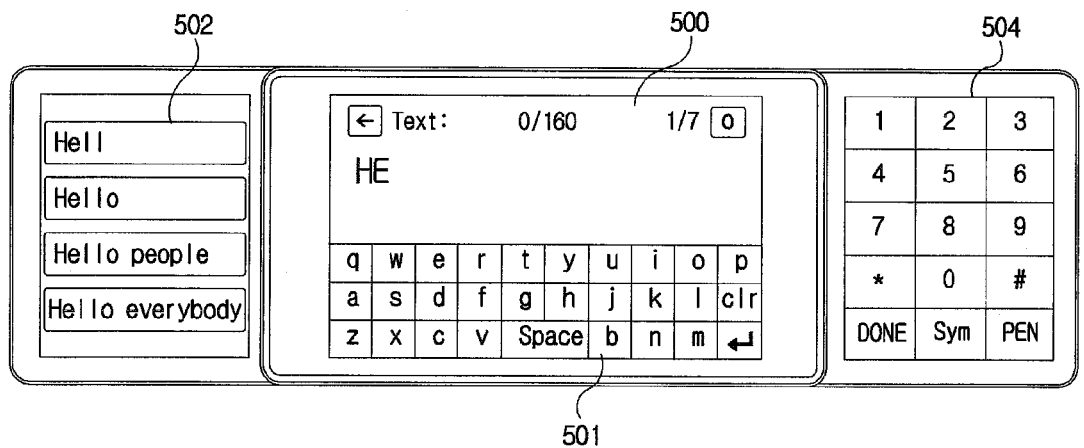
FIG. 12 illustrates a display of a text message preparation menu in a mobile terminal according to an embodiment of the present disclosure.

FIG. 12 illustrates a display of a text message preparation menu in a mobile terminal according to an embodiment of the present disclosure. In this embodiment, a text message preparation screen is displayed when the sliding units are fully opened.

As illustrated in FIG. 12, when the sliding units are completely opened, the mobile terminal 100 may enter a text messaging mode. Here, the main display may display a text message display window 500 and a qwerty key input window 501, the first sub-display may display a recommendation phrase list 502 according to input word, and the second sub-display may display a number keypad 504 of the mobile terminal. The main display and/or the sub-displays may be touch screens. Accordingly, the user may employ 3 (three) touch screens to conveniently input text.

Figure 13:
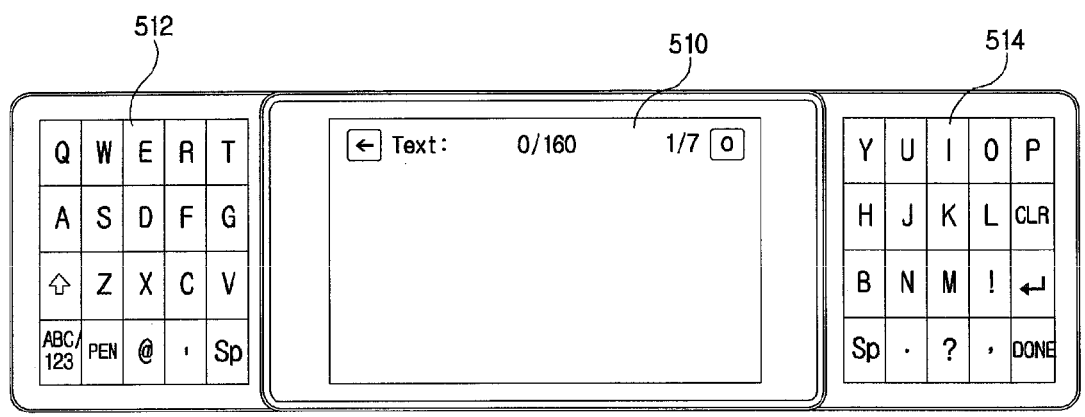
FIG. 13 illustrates a display of a text message preparation menu in a mobile terminal according to another embodiment of the present disclosure.

FIG. 13 illustrates a display of a text message preparation menu in a mobile terminal according to another embodiment of the present disclosure. In this embodiment, the sliding units are fully opened to display another text message preparation screen. When the sliding units are fully opened such that the mobile terminal 100 displays the text message preparation screen, the main display may display a text message display 510, the first sub-display may display a left-half keyboard 512 of qwerty key, and the second sub-display may display a right-half keyboard 514 of qwerty key, as shown in FIG. 13. Accordingly, the user may input a qwerty key through the sub-displays on both sides of the mobile terminal 100.

Figure 14:
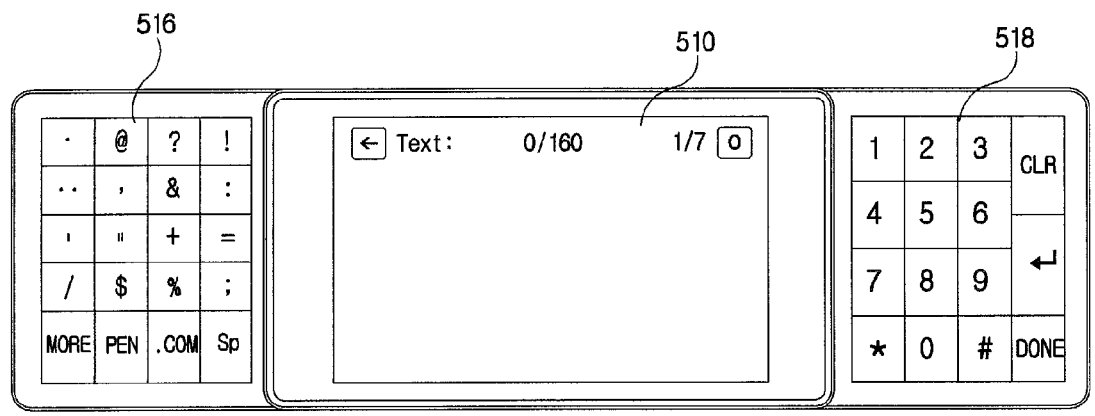
FIG. 14 illustrates a display of a text message preparation menu in a mobile terminal according to yet another embodiment of the present disclosure.

FIG. 14 illustrates a display of text message preparation menus in a mobile terminal according to yet another embodiment of the present disclosure. In this embodiment, the sliding units are completely opened to display yet another text message preparation screen. As shown in FIG. 14, the main display may display a text message display 510, the first sub-display may display a special text list 516, and the second sub-display may display a number key 518 on the mobile terminal 100. In this embodiment, the user may input special characters through sub-displays on both sides of the mobile terminal 100.

In an embodiment, a mobile terminal may include a main body disposed at an upper surface thereof with a main display; a first sliding unit slidably disposed at a lower surface of the main body and disposed with a first sub-display; a second sliding unit slidably disposed on the main body and disposed with a second sub-display, where the second sliding unit is symmetrically formed to the first sliding unit; a sliding signal generating device configured to generate a first signal, if at least one of the first sliding unit and the second sliding unit slides to a first position, and to generate a second signal if at least one of the first sliding unit and the second sliding unit slides to a second position; and a controller configured to controllably cause a preset first menu to be displayed on the main display in response to the first signal and a preset second menu to be displayed on the main display in response to the second signal.

The mobile terminal may further include a camera, and the controller may controllably cause the main display to display a camera preview image obtained by the camera, and to controllably cause at least one of the first sub-display and the second sub-display to display a camera control menu, if the first signal is generated.

The mobile terminal may also include a memory and a camera, and the controller may controllably cause the main display to display a camera preview image obtained by the camera, and controllably cause the first sub-display to display a photographed image stored in the memory, and controllably cause the second sub-display to display a camera control menu, if the second signal is generated.

The mobile terminal may further include a sensing unit for sensing an inclination to gravity of the mobile terminal, and the controller may controllably change the display of the main display, the first sub-display and the second sub-display in response to an inclination detection signal to the gravity of the mobile terminal while the first sub-display and the second sub-display are unfolded. The mobile terminal may further include the main body and a stopper configured to cause at least one of the first sliding unit and the second sliding unit to stop sliding at the first position.

In another embodiment, a mobile terminal may include a main body disposed at an upper surface thereof with a main display; a first sliding unit slidably disposed at a lower surface of the main body and disposed with a first sub-display; a second sliding unit slidably disposed on the main body and disposed with a second sub-display, where the second sliding unit is symmetrically formed to the first sliding unit; and a controller configured to controllably cause the main display to display a display screen if the first sliding unit and the second sliding unit are moved across the main display, and to controllably cause at least one of the first sub-display and the second sub-display to display a control command input screen relative to the display screen.

In this embodiment, the controller may controllably cause the first sub-display to display a detailed information screen, and the second sub-display to display a control command input screen of the display screen. The mobile terminal may further include a camera, wherein the display screen may be a preview image obtained from the camera, the detailed information screen may be a gallery screen, and the control command input screen may be a camera control command input screen.

In this embodiment, the mobile terminal may further include a wireless communication unit (wireless communication interface) configured to connect with an Internet server, wherein the display screen may be a webpage screen received from the wireless communication unit, and the detailed information screen may be a "visited page" or "home page" screen.

Moreover, the first sub-display and the second sub-display may be touch screens, and the controller may controllably cause the main display to display a text display screen, and the first sub-display and the second sub-display to display a keyboard input screen. The first sub-display and the second sub-display may respectively display a left-half keyboard and a right-half keyboard of QWERTY keyboard. The first sub-display may also display a number keypad for mobile terminal and the second sub-display may be displayed with a special text keypad.

The main display, the first sub-display, and the second sub-display may be touch screens, wherein the controller may be configured to controllably cause the main display to display the QWERTY keypad, the first sub-display to display a number keypad, and the second sub-display to display a recommended word list.

The controller may also controllably cause at least one of the first sub-display and the second sub-display to be displayed as a control command input screen of the second menu if a second menu is executed while a first menu is being executed. The first menu may be an Internet web browser, and the second menu may be an MP3 execution menu.

A method for displaying a menu in a mobile terminal is broadly described and embodied herein. The method may include providing a first sliding unit and a second sliding unit, each unit slidable to both sides; generating a first signal if at least one of the first sliding unit and the second sliding unit slide to a first position; generating a second signal if at least one of the first sliding unit and the second sliding unit slide to a second position; and displaying a preset first menu on a main display of the mobile terminal in response to the first signal and displaying a preset second menu on the main display in response to the second signal.

The step of displaying a preset first menu on a main display of the mobile terminal in response to the first signal and displaying a preset second menu on the main display in response to the second signal may include displaying a camera preview image obtained by a built-in camera of the mobile terminal in response to the first signal, wherein the method for displaying a menu may further include displaying a camera control menu on at least one of the first sub-display and the second sub-display.

The step of displaying a preset first menu on a main display of the mobile terminal in response to the first signal and displaying a preset second menu on the main display in response to the second signal may include displaying a camera preview image obtained by a built-in camera of the mobile terminal in response to the second signal, wherein the method for displaying menu may further include displaying a stored photograph image on the first sub-display, and displaying a camera control menu on the second sub-display.

The method may further include changing the display of the main display, the first sub-display, and the second sub-display in response to an inclination detection signal of the mobile terminal that corresponds to gravity if an inclination to gravity of the mobile terminal is sensed while the first sub-display and the second sub-display are unfolded.

Moreover, the step of generating a first signal if at least one of the first sliding unit and the second sliding unit slide to a first position may include stopping, by a stopper disposed on the mobile terminal, at least one of the first sliding unit and the second sliding unit at the first position.

In another embodiment, a display device for a mobile terminal may include a main display; a first sub-display positioned on the main display; a second sub-display positioned on the main display, wherein the first sub-display and the second sub-display are positioned on a rear surface of the main display adjacent to one another and configured to extend from the main display in opposite directions; a sensor configured to detect a plurality of positions of at least one of the first or second sub-displays; wherein if the at least one of the first or second sub-displays is extended to a first position, the main display may display a first set of information, and if the at least one of the first or second sub-displays is extended to a second position, the main display may display a second set of information.

The display device may further include a camera, wherein when the at least one of the first or second sub-displays is moved to the first position, the main display may display a camera preview image captured by the camera, and the at least one of the first sub-display or the second sub-display may display a camera control menu. The display device may also include a memory and a camera, wherein when the at least one of the first or second sub-displays is moved to the second position, the main display may display a camera preview image captured by the camera, the first sub-display may display at least one thumbnail image of an image stored in the memory, and the second sub-display may display a camera control menu.

In this embodiment, the display device may further include an orientation sensor that may sense an orientation of the mobile terminal, wherein an orientation of the information displayed on the main display, the first sub-display, and the second sub-display may be changed to correspond to the orientation of the mobile terminal. Moreover, the display device may further include a stopper configured to position the at least one of the first or second sub-displays at the first position, wherein the stopper is formed on at least one of the main display, the first sub-display, or the second sub-display.

In another embodiment, a method for controlling a display on a mobile terminal may include sliding at least one of a first sub-display or a second sub-display to extend from a main display, wherein the first sub-display and the second sub-display are positioned on a rear surface of the main display adjacent to one another and configured to extend in opposite directions; sensing a position of the at least one of the first sub-display or the second sub-display; displaying on the main display a first set of information if the at least one of the first sub-display or the second sub-display is at a first position; and displaying on the main display a second set of information if the at least one of the first sub-display or the second sub-display is at a second position.

In this embodiment, the displaying on the main display the first set of information may include displaying a camera preview image captured by a built-in camera of the mobile terminal, and displaying a camera control menu on at least one of the first sub-display or the second sub-display. Moreover, the displaying on the main display the second preset menu may include displaying a camera preview image captured by a built-in camera of the mobile terminal, displaying a gallery on the first sub-display, wherein the gallery includes at least one thumbnail image of images stored in the mobile terminal, and displaying a camera control menu on the second sub-display.

The method may further include detecting a change in an orientation of the mobile terminal, and changing an orientation of the information displayed on the main display, the first sub-display and the second sub-display to correspond to the orientation of the mobile terminal. In this embodiment, the sliding the at least one of the first or second sub-displays to extend from the main display includes holding the at least one of the first or second sub-displays at the first or second positions using a stopper provided on the mobile terminal.

In yet another embodiment, a display device for a mobile terminal may include a main body including a main display on a first surface; a first sliding assembly positioned on a second surface of the main body and having a first sub-display; a second sliding assembly positioned on the second surface of the main body and having a second sub-display, wherein the first and second sliding assemblies are positioned adjacent to one another and configured to slide in opposite directions to extend from the main body, wherein if at least one of the first sliding assembly or the second sliding assembly is extended from the main display, information displayed on the main display or the at least one of the first or second sub-displays changes based on a distance in which the at least one of the first sliding assembly or the second sliding assembly is extended from the main body.

In this embodiment, the first sub-display may display a detailed information screen associated with the information displayed on the main display, and the second sub-display may display an input screen associated with the information displayed on the main display.

The display device may further include a camera, wherein the main display displays a preview image captured by the camera, the first sub-display displays at least one thumbnail image of images stored on the mobile terminal, and the second sub-display displays a camera control input screen. The display device may further include a wireless communication interface configured to establish a connection with a server over a network, wherein the main display may display a webpage received from the server, and the first sub-display may display a browser history screen that includes at least one link to a previously visited webpage.

In this embodiment, the at least one of the first or second sub-displays may be touch screens, and wherein the main display may display a text display screen, and the at least one of the first or second sub-displays displays a keyboard. The first sub-display displays a left-half of a qwerty keyboard and the second sub-display displays a right-half of a qwerty keyboard. The first sub-display may display a number keypad and the second sub-display may display a special text keypad.

Moreover, the main display, the first sub-display, and the second sub-display may be touch screens, and wherein the main display displays a qwerty keypad, the first sub-display displays a number keypad, and the second sub-display displays a recommended word list.

In this embodiment, the main display may display information associated with a first application program and the at least one of the first or second sub-displays may display information associated with a second application program, wherein the first and second application programs operate concurrently. The first application program may be an Internet web browser, and the second application program may be an MP3 player.

The above-described methods may be implemented in a program recorded medium such as computer-readable codes or computer-readable media. The computer-readable media may include all kinds of recording devices in which data readable by a computer system may be stored. The computer-readable media includes, for example, ROM, RAM, CD-ROM, magnetic tapes, floppy discs, optical data storage devices, and the like, and also includes carrier-wave type implementations (e.g., transmission via Internet).

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device for a mobile terminal comprising:
   a main display;
   a first sub-display positioned on the main display;
   a second sub-display positioned on the main display, wherein the first sub-display and the second sub-display are positioned on a rear surface of the main display adjacent to one another and configured to extend from the main display in opposite directions from the main display; and
   a sensor configured to detect an opened state of the first and second sub-displays, wherein
   when the first and second sub-displays are extended to a position of a semi-open state, the main display displays a first set of information, wherein the semi-open state is a state in which the first and second sub-displays are extended to a prescribed distance, and
   when the first and second sub-displays are extended to a position of an open state, the main display displays a second set of information different from the first set of information, wherein the open state is a state in which the first and second sub-displays are fully extended, and wherein all three displays change the displayed information according to the opened state of the first sub-display and the second sub-display.

2. The display device of claim 1, further comprising a camera, wherein when the first and second sub-displays are moved to the position of the semi-open state, the main display displays a camera preview image captured by the camera, and the at least one of the first sub-display or the second sub-display displays a camera control menu.

3. The display device of claim 1, further comprising a memory and a camera,
   wherein when the first and second sub-displays are moved to the position of the open state, the main display displays a camera preview image captured by the camera, the first sub-display displays at least one thumbnail image of an image stored in the memory, and the second sub-display displays a camera control menu.

4. The display device of claim 1, further comprising an orientation sensor that senses an orientation of the mobile terminal, wherein an orientation of the information displayed on the main display, the first sub-display, and the second sub-display are changed to correspond to the orientation of the mobile terminal.

5. The display device of claim 1, further comprising a stopper configured to position the first and second sub-displays at the position of the semi-open state, wherein the stopper is formed on at least one of the main display, the first sub-display, or the second sub-display.

6. A method for controlling a display on a mobile terminal, the method comprising:
   sliding the first sub-display and a second sub-display to extend from a main display, wherein the first sub-display and the second sub-display are positioned on a rear surface of the main display adjacent to one another and configured to extend in opposite directions from the main display;
   sensing a position of the first sub-display and the second sub-display;
   displaying on the main display a first set of information if the first sub-display and the second sub-display are at a position of a semi-open state, wherein the semi-open state is a state in which the first and second sub-displays are extended to a prescribed distance; and
   displaying on the main display a second set of information different from the first set of information if the first sub-display and the second sub-display are at a position of an open state, wherein the open state is a state in which the first and second sub-displays are fully extended, and wherein displaying on the main display includes changing the information on all three displays according to the opened state of the first sub-display and the second sub-display.

7. The method of claim 6, wherein the displaying on the main display the first set of information includes
   displaying a camera preview image captured by a built-in camera of the mobile terminal, and
   displaying a camera control menu on at least one of the first sub-display or the second sub-displays.

8. The method of claim 6, wherein the displaying on the main display the second set of information includes
   displaying a camera preview image captured by a built-in camera of the mobile terminal,
   displaying a gallery on the first sub-display, wherein the gallery includes at least one thumbnail image of images stored in the mobile terminal, and
   displaying a camera control menu on the second sub-display.

9. The method of claim 6, further comprising
   detecting a change in an orientation of the mobile terminal, and
   changing an orientation of the information displayed on the main display, the first sub-display and the second sub-display to correspond to the orientation of the mobile terminal.

10. The method of claim 6, wherein the sliding the first and second sub-displays to extend from the main display includes holding the first and second sub-displays at the position of the semi-open state or the positions of a open state using a stopper provided on the mobile terminal.

11. A display device for a mobile terminal comprising:
a main body including a main display on a first surface;
a first sliding assembly positioned on a second surface of the main body and having a first sub-display;
a second sliding assembly positioned on the second surface of the main body and having a second sub-display, wherein the first and second sliding assemblies are positioned adjacent to one another and configured to slide in opposite directions to extend from the main body, wherein
when the first sliding assembly and the second sliding assembly are extended from the main display, information displayed on the main display and the first and second sub-displays changes based on a state in which the first sliding assembly and the second sliding assembly are extended from the main body, wherein the state includes a semi-open state in which the first and second sub-displays are extended to a prescribed distance and an open state in which the first and second sub-displays are fully extended, and wherein all three displays change the displayed information according to the opened state of the first sliding assembly and the second sliding assembly.

12. The display device of claim 11, wherein the first sub-display displays a detailed information screen associated with the information displayed on the main display, and the second sub-display displays an input screen associated with the information displayed on the main display.

13. The display device of claim 11, further comprising a camera, wherein
the main display displays a preview image captured by the camera,
the first sub-display displays at least one thumbnail image of images stored on the mobile terminal, and
the second sub-display displays a camera control input screen.

14. The display device of claim 11, further comprising
a wireless communication interface configured to establish a connection with a server over a network, wherein
the main display displays a webpage received from the server, and
the first sub-display displays a browser history screen that includes at least one link to a previously visited webpage.

15. The display device of claim 11, wherein the at least one of the first or second sub-displays are touch screens, and wherein
the main display displays a text display screen, and
the at least one of the first or second sub-displays displays a keyboard.

16. The display device of claim 15, wherein the first sub-display displays a left-half of a qwerty keyboard and the second sub-display displays a right-half of a qwerty keyboard.

17. The display device of claim 15, wherein the first sub-display displays a number keypad and the second sub-display displays a special text keypad.

18. The display device of claim 11, wherein the main display, the first sub-display, and the second sub-display are touch screens, and wherein
the main display displays a qwerty keypad,
the first sub-display displays a number keypad, and
the second sub-display displays a recommended word list.

19. The display device of claim 11, wherein
the main display displays information associated with a first application program,
the first and second sub-displays display information associated with a second application program, wherein the first and second application programs operate concurrently.

20. The display device of claim 19, wherein the first application program is an Internet web browser, and the second application program is an MP3 player.

* * * * *